United States Patent Office 2,826,611
Patented Mar. 11, 1958

2,826,611

PROCESS FOR MAKING AR-DINITRO-PHENYLUREAS

Bryant C. Fischback, Walnut Creek, and Guy H. Harris, William E. Brown, and William H. Taplin III, Concord, Calif., assignors to The Dow Chemical Company, Midland, Mich., a corporation of Michigan No Drawing. Application February 2, 1956
Serial No. 562,921

10 Claims. (Cl. 260—553)

This invention relates to a procedure for nitrating arylureas to produce good yields of dinitrophenylureas and related compounds in which both nitro groups are attached to the benzene ring.

2,4-dinitrophenylurea and some of its homologs and analogs have found utility in animal feeds as a means for controlling intestinal parasites, particularly coccidia in poultry. The prior methods for producing such compounds are not considered satisfactory for commercial manufacturing operations. Thus, a principal method described by Reudler, Rec. Trav. Chim. 33, 35–84 (1914) and C. A. 8, 2373–5 (1914), involves the formation of 3-(2,4-dinitrophenyl)-1-nitrourea followed by a treatment with ammonia in an alcoholic medium. The product of the final step is contaminated with several percent of an alkyl ester of 2,4-dinitrocarbanilic acid. Purification to remove this compound from the desired product is difficult and costly. Ryan and O'Toole report, C. A. 17, 1792–3 (1923), that the nitration of a solution of phenylurea in carbon tetrachloride, using 6 mols of nitric acid, gave only the 3-(2,4-dinitrophenyl)-1-nitrourea, whereas nitration with either nitrogen dioxide or nitrous anhydride gave only a mononitrophenylurea.

In another procedure described by Scholl and Holdermann, Ann. 345, 382–4 (1906), phenyl methylurea is dissolved in strong sulfuric acid at —3° to —8° C., and the solution is subjected to the dropwise addition of ethyl nitrate in amount equal to 1.1 mols of nitrate per mol of the urea, when a mononitrophenyl compound is prepared, or in amount equal to 2.1 mols of nitrate when a dinitrophenyl compound is prepared. According to that procedure, the reagents are stirred together at —8° C. for ¾ hour, and the mixture is poured into an excess of ice water from which the nitrated product is recovered for recrystallization. No yield data are given by Scholl and Holdermann, but repetition of their process and variations of it shows that the reaction temperature they employed is not as advantageous as certain other temperatures, and that precipitation of the dinitrophenyl urea compound in ice water at the normal temperature of 0° C. gives a poor recovery of a slimy product.

It is the principal object of this invention to provide an improved procedure for the preparation and recovery in good yields of dinitrophenylureas substantially free from nitroureas and from nitrocarbanilic acids.

The present invention is such a procedure applicable to the preparation of ar-dinitroarylureas having the general formula

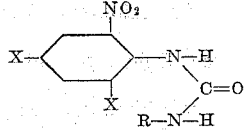

wherein R is hydrogen or an alkyl group of from 1 to 4 carbon atoms, one X is a nitro group and the other X is from the class consisting of hydrogen, fluorine, chlorine, bromine, iodine, alkyl groups of 1 to 6 carbon atoms, and cyclohexyl, and, when said other X is para to the nitrogen atom, hydroxyl and alkoxyl of from 1 to 4 carbon atoms. These are prepared from arylureas having the formula:

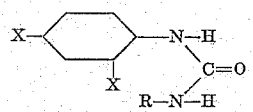

wherein R has the definition given above, one X is hydrogen and the other X has the definition previously given.

The method of the invention comprises mixing the arylurea to be nitrated with at least enough of a volatile organic liquid which is inert to both sulfuric and nitric acids to wet the arylurea, adjusting the pressure in the reaction vessel so that said liquid boils at a temperature in the range from —20° to +20° C., condensing the evolved vapors, returning the condensed inert liquid to maintain a temperature in said range, adding enough sulfuric acid of at least 90 percent concentration (preferably 95–98) to dissolve the arylurea at said temperature, adding from 2.00 to 2.05 mols of nitric acid of at least 70 percent concentration (preferably near 90), increasing the pressure in the reaction vessel to raise the boiling temperature of said inert liquid to a higher value at which the urea compounds are dissolved in the acid medium in the range from +5° to 35° C. until nitration is complete, removing the inert liquid at a temperature not significantly above 35° C., and precipitating the dinitroarylurea in water maintained at from 10° to 20° C. during the precipitation.

The inert liquids which may be used include such volatile saturated hydrocarbons as pentane, hexane, and cyclohexane, and such halogenated hydrocarbons as methylene chloride, dichlorodifluoromethane, carbon tetrachloride, perchloroethylene, ethylene chloride, and others of the halogenated methanes and ethanes. The preferred inert liquids are those such as pentane (36° C.) and methylene chloride (40° C.) whose boiling points at normal pressure are a few degrees higher than any temperature to be used during the reaction, so that the desired temperature control can be effected by a moderate decrease in the internal pressure in the reaction vessel. For safety reasons, the non-flammable halogenated liquids are preferred. The inert liquid may, but need not be a solvent for the arylurea.

The arylureas which can be dinitrated easily and in good yields by the present method include phenylurea, o- and p-monohalophenylureas, o- and p-methyl, ethyl, propyl, isopropyl, butyl, isobutyl, tertiarybutyl, amyl, isoamyl, hexyl and cyclohexyl phenylureas, p-hydroxyphenylurea, p-methoxy, ethoxy, propoxy, and butoxyphenylureas.

When the reaction is carried out as herein described the yield of dinitroarylurea is 80 percent, or more, and is often over 90 percent.

The following specific examples illustrate the practice of the invention.

Example 1

Phenylurea (45.6 grams; 0.335 mol) was suspended in 150 ml. of methylene chloride in a reaction vessel equipped with a stirrer, a dropping funnel, and a reflux condenser whose jacket contained circulating brine at —10° C. The pressure in the reaction vessel was reduced to about 180 mm. of mercury by connecting the top of the reflux condenser with a suction means. This caused the methylene chloride to boil at 4° to 6° C. There was then added through the dropping funnel 182 ml. of 96 percent sulfuric acid, in the course of 23 minutes. To the resulting clear mixture was added 0.670 mol (31.5 ml.) of fuming 90 percent nitric acid, over the course of 26 minutes, the temperature in the reactor being held at 7° C. by the refluxing methylene chloride. The reaction temperature was then increased to 22° C. by increasing the pressure and by external application of heat, and was maintained at this level by continued reflux of methylene chloride. All of the solids which had separated at 7° C. redissolved at 22° C. The latter temperature was maintained for 30 minutes. Finally, methylene chloride was distilled away from the reaction mixture under reduced pressure at a temperature below 35° C. The remaining acid solution was poured into water at such a rate that, by the addition of ice, the precipitation temperature was kept in the range from 10° to 20° C. The yellow precipitate was not sticky, and was collected by filtration, washed with water, sodium bicarbonate solution, and more water. After drying, the 2,4-dinitrophenylurea weighed 69.6 grams (a yield of 92 percent) and melted at 194.5°–195.8° C.

*Example 2*

4,6-dinitro-2-methylphenylurea was made in analogous manner from o-tolylurea (40.5 g.; 0.2695 mol), using carbon tetrachloride as the inert medium. The 95 percent sulfuric acid (200 ml.) was added at 12°–15° C., and 90 percent nitric acid (25 ml.; 0.539 mol) was added at 12° C. Reaction was effected for 10 minutes at 10° C. after all of the nitric acid had been added. The temperature was then caused to rise to 30° C., over the course of 30 minutes. The resulting solution was precipitated in water held at 15° C. After neutralization and washing the pale yellow product was crystallized from boiling acetic acid. The yield was over 90 percent and the melting point was 207.6°–208.0° C.

*Example 3.—(4-chloro-2,6-dinitrophenyl)urea*

In an analogous manner, (4-chlorophenyl)urea (42.7 grams, 0.250 mol) was suspended in perchloroethylene, and this slurry was added to 200 ml. of 95 percent sulfuric acid, the temperature being held below 15° C. by reduced pressure boiling of the perchloroethylene. Ninety percent nitric acid (23.9 ml.; 0.51 mol) was added between 0 and 10° C. The temperature was raised to 20.5° C. over the course of 30 minutes after all the HNO3 was in. The perchloroethylene was removed by reduced pressure distillation. The product was precipitated in water held between 10 and 20° C. The orange solid obtained was filtered, washed well with water, then with aqueous sodium bicarbonate, and then with water again. Air drying gave 58.1 grams of (4-chloro-2,6-dinitrophenyl)urea representing a yield of 89.2 percent. The melting point was 221.4–222.7° C. (dec.). Chlorine analysis was 14.0 percent and nitrogen was 21.0 percent. Theory requires 13.61 percent and 21.5 percent, respectively.

*Example 4.—(2-chloro-4,6-dinitrophenyl)urea*

Similarly, (2-chlorophenyl)urea (30 grams, 0.1758 mol) was suspended in pentane, and this slurry was added to 200 ml. of about 92 percent sulfuric acid. The temperature was held below 10° C. by reduced pressure boiling of the pentane. Not all the (2-chlorophenyl)urea dissolved. Nevertheless, the 90 percent nitric acid (16.9 ml.; 0.36 mol) was added below 10° C. and then the solution was heated to 20° C. and held there for 45 minutes. The pentane was removed by reduced pressure distillation. The product was then precipitated in water held at 15 to 20° C. by the addition of ice. The yellow precipitate was filtered, washed well with water, then with 10 percent sodium bicarbonate solution in water, and again with water. After air-drying, the melting point of the product was 203–207° C. (dec.). Yield was 36.9 grams, or 80.5 percent. Chlorine analysis was 13.68 percent, while theory requires 13.60 percent.

These and other tests have shown that the optimum temperature for initial mixing of the reagents is from 0° to 10° C., the optimum reaction temperature is from 20° to 25° C., and the yield of the dinitro compound is adversely affected when operations are carried out either much below or much above these values as well as when the nitric and sulfuric acids contain more than the suggested amounts of water. Temperatures of reaction below 0° C. slow the reaction unduly, while those much above 25° C., if such temperature is maintained very long, cause hydrolysis of the product to a dinitroaniline, dinitrocarbanilic acid, or similar compound.

We claim:

1. The method which comprises providing a mixture in a reaction vessel of (1) an arylurea, having the formula:

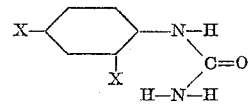

wherein one X is from the class consisting of hydrogen, halogen, alkyl groups containing from 1 to 6 carbon atoms, cyclohexyl, para-hydroxy, and para-alkoxy of from 1 to 4 carbon atoms, and the other X is hydrogen, with (2) at least enough of a volatile organic liquid, which is inert to both sulfuric and nitric acids at the hereinafter designated temperatures, to wet the arylurea; adjusting the pressure in the reaction vessel so that said inert liquid boils at a temperature in the range from −20° to +20° C., condensing the evolved vapors, returning the condensed inert liquid to the reaction vessel to maintain a temperature in said range; adding enough sulfuric acid of at least 90 percent concentration to dissolve the arylurea at said temperature; adding from 2.00 to 2.05 mols of nitric acid of at least 70 percent concentration; thereafter increasing the pressure in the reaction vessel to raise the boiling temperature of said inert liquid to a higher value at which the urea compounds are dissolved in the acid medium in the range from +5° to 35° C., until nitration is complete; removing the inert liquid at a temperature not significantly above 35° C., and precipitating the so-formed dinitroarylurea in water maintained at from 10° to 20° C. during the precipitation.

2. The method claimed in claim 1, wherein the sulfuric acid is from 95 to 98 percent concentration.

3. The method claimed in claim 1, wherein the nitric acid is of near 90 percent concentration.

4. The method claimed in claim 1, wherein the inert liquid is methylene chloride.

5. The method claimed in claim 1, wherein the inert liquid is carbon tetrachloride.

6. The method claimed in claim 1, wherein the inert liquid is perchloroethylene.

7. The method claimed in claim 1, wherein the inert liquid is pentane.

8. The method claimed in claim 1, wherein the arylurea subjected to nitration is phenylurea.

9. The method claimed in claim 1, wherein the arylurea subjected to nitration is o-tolylurea.

10. The method claimed in claim 1, wherein the arylurea subjected to nitration is a monochlorophenylurea.

References Cited in the file of this patent

Reudler: Rec. Trav. Chim. vol. 33, pp. 40 and 44 (1914).

Kniphorst: Rec. Trav. Chim., vol. 44, pp. 700, 725 and 726 (1925).

Lorang: Rec. Trav. Chim., vol. 46, pp. 636 and 642 (1927).

Monchy: Rec. Trav. Chim., vol. 53, p. 157 (1934).